United States Patent [19]

Konarski

[11] 4,375,276
[45] Mar. 1, 1983

[54] VARIABLE GEOMETRY EXHAUST NOZZLE

[75] Inventor: Mieczyslaw Konarski, Lawrenceburg, Ind.

[73] Assignee: General Electric Company, Cincinnati, Ohio

[21] Appl. No.: 155,336

[22] Filed: Jun. 2, 1980

[51] Int. Cl.³ .............................................. B64C 15/06
[52] U.S. Cl. ................................. 239/265.29; 60/232
[58] Field of Search ...................... 239/265.29, 265.39, 239/265.41, 265.43, 265.17; 60/232, 271

[56] References Cited

U.S. PATENT DOCUMENTS

| | | | |
|---|---|---|---|
| 2,846,843 | 8/1958 | Clark et al. | 239/265.39 X |
| 3,299,638 | 1/1967 | Santamaria et al. | 60/204 |
| 3,684,182 | 8/1972 | Maison | 239/265.35 X |
| 3,873,027 | 3/1975 | Cambouliures et al. | 239/265.33 |
| 3,897,907 | 8/1975 | Colley | 239/265.39 |
| 4,241,876 | 12/1980 | Pedersen | 239/265.27 |

OTHER PUBLICATIONS

Electromechanical Flight Control Activation, Bird—Nov. 1977.
Report No. NASA CR-135289/General Electric Company, dated Jun. 1978, pp. 7a and 7b.

*Primary Examiner*—Robert B. Reeves
*Assistant Examiner*—Gene A. Church
*Attorney, Agent, or Firm*—Francis L. Conte; Derek P. Lawrence

[57] ABSTRACT

An exhaust nozzle for a gas turbine engine including a plurality of primary and secondary flaps which are pivotally positionable for varying the geometry of the nozzle and for providing thrust vectoring. Electromechanical actuators preferably are used to position the flaps. The inner surfaces of the primary flaps are preferably curved convexly to continually maintain the location of the nozzle throat on the primary flaps. Reverser doors can be added to permit thrust reversal and fairing flaps can be included outwardly of the primary and secondary flaps to maintain a smooth, aerodynamic flow.

16 Claims, 7 Drawing Figures

VARIABLE GEOMETRY EXHAUST NOZZLE

BACKGROUND OF THE INVENTION

1. Field of the Invention

This invention relates to exhaust nozzles and particularly to a new and improved exhaust nozzle which is effective for varying the size of the exhaust opening and for providing a thrust vectoring capability.

2. Description of the Prior Art

Exhaust systems, particularly for modern, high speed, military aircraft, must be capable of providing cruise efficiency and a high degree of maneuverability.

Cruise efficiency can be achieved through the use of a variable geometry exhaust nozzle. A variable geometry nozzle permits the size of the exhaust opening to be changed in response to changes in flight conditions, such as air speed and altitude. However, changing the geometry of an exhaust nozzle can result in areas of high stress, which are caused by the pressure of the exhaust gases, being shifted to portions of the nozzle which are less capable of withstanding such stress. For example, most exhaust nozzles for high speed aircraft employ a converging/diverging exhaust nozzle. By converging/diverging, it is meant that the cross-sectional area of the exhaust nozzle in a downstream direction decreases to a position of minimum area, called the throat, and then increases to the downstream end of the nozzle. Exhaust nozzles are often made variable through the use of a plurality of moveable nozzle sections. Varying the geometry of such a nozzle can move the throat, on which is exerted a high concentration of stress, to a nozzle section which is less capable of withstanding such stress than are other sections. Structural fatigue which results can shorten the useful life of the stressed sections which in turn results in higher cost to the user.

Aircraft maneuverability can be achieved through the use of a vectorable exhaust nozzle. Since the resultant thrust vector of an engine is in a direction opposite to the direction at which the exhaust gases exit the engine exhaust nozzle, by pivotally changing the exit angle of the nozzle, the thrust vector can be correspondingly changed.

Most currently used vectorable exhaust nozzles, however, are limited as to the range of pivotal movement available. For example, two-dimensional nozzles, that is those which define a generally rectangular exhaust opening, are being considered for use on high speed aircraft. Suggested means for thrust vectoring in two-dimensional nozzles have generally been either gimbaling the entire nozzle or pivoting flaps located at the nozzle exit. Either means by itself has a pivotal limitation, due to structural, kinematic, or aerodynamic constraints. Greater degrees of pivotal movement can be achieved by combining flaps with a gimbaled nozzle. However, such a combined nozzle would require complicated hardware and controls and thus be expensive.

Another problem which is encountered in exhaust nozzles which are vectorable or which have a variable geometry is that most are actuated by hydraulically powered servo units. Such servo units, and the associated plumbing and valving, are relatively heavy and space consuming and are costly. Furthermore, the hydraulic lines, particularly in the hostile environment in which a military aircraft might operate, are more vulnerable to being damaged and thereby rendering the servo units inoperative, than would, for example, electrically operated actuators. Additionally, it is very difficult to mount hydraulically actuated pivotable control surfaces in tandem, that is with one pivotable control surface mounted on another pivotable control surface, such as might be desirable to achieve a greater degree of thrust vectoring. Such an arrangement would necessitate the hydraulic lines themselves being pivotable in order to reach the servo unit for the second control surface. Thus, hydraulically actuated exhaust nozzles present numerous limitations.

In view of the above-mentioned problems, it is, therefore, an object of the present invention to provide a variable geometry exhaust nozzle in which the location of the nozzle throat is continually maintained on the structurally strongest portions of the nozzle.

Another object of the present invention is to provide a vectorable exhaust nozzle which has a large range of pivotal movement and yet which is structurally simple and therefore of lower cost.

Yet another object of the present invention is to provide a variable geometry, vectorable exhaust nozzle which utilizes electromechanical actuators and thereby avoids many limitations of hydraulic actuators.

SUMMARY OF THE INVENTION

The present invention, in accordance with one embodiment thereof, comprises an exhaust nozzle for a gas turbine engine which permits varying of the size of the exhaust opening and vectoring of the engine thrust. The exhaust nozzle comprises a plurality of primary flaps, each having a portion, preferably an upstream portion, pivotally connected with a fixed structure of the exhaust nozzle. A plurality of secondary flaps are disposed downstream of the primary flaps and each secondary flap has a portion, preferably an upstream portion, which is pivotally connected with the downstream end of a primary flap. The exhaust nozzle includes means for pivotally positioning the primary and secondary flaps.

In a particular embodiment of the invention, the means for pivotally positioning the primary and secondary flaps preferably comprise electromechanical actuators disposed within the upstream portion of the flaps. Each electromechanical actuator is fixedly secured with the primary or the secondary flap and includes torque shafts extending therefrom secured either with the sidewalls, when the actuator is disposed in the primary flap, or with the downstream portion of the primary flap, when the actuator is disposed in the secondary flap.

In another embodiment of the invention, the inner surfaces of the primary flaps are curved convexly in a downstream direction in order to maintain the location of the nozzle throat continually on the primary flaps.

The nozzle can include sidewalls and upper and lower walls. Fairing flaps are utilized to maintain smooth aerodynamic flow on the external sides of the flaps, and thrust reverser doors are included for reversing engine thrust.

BRIEF DESCRIPTION OF THE DRAWING

This invention will be better understood from the following description taken in conjunction with the accompanying drawing, wherein.

DESCRIPTION OF THE PREFERRED EMBODIMENT

Figure 1:
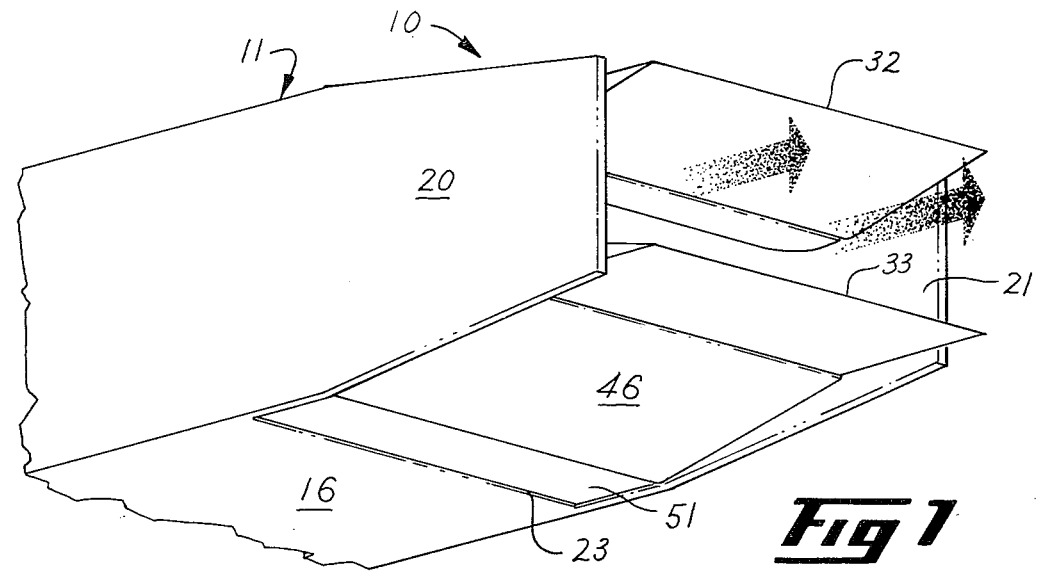
FIG. 1 is a fragmentary rear perspective view of an exhaust nozzle incorporating features of the present invention.

Turning now to a consideration of the drawing, and in particular to FIG. 1, there is shown an exhaust nozzle for a gas turbine engine. The exhaust nozzle 10 is located downstream of a gas turbine engine (not shown) and at the downstream end of the engine nacelle 11. The exhaust nozzle 10 provides an exhaust opening to the gases exiting the engine in the direction of the arrows. FIG. 1 shows the exhaust nozzle 10 defining a generally rectangular opening. Such a nozzle is referred to as a two-dimensional nozzle. Although the preferred embodiment of this invention is described as being employed in a two-dimensional nozzle, it is to be understood that this invention can also be effectively utilized in other embodiments, such as in a three-dimensional nozzle, for example, one defining a generally curved, frequently circular, exhaust opening.

Figure 2:
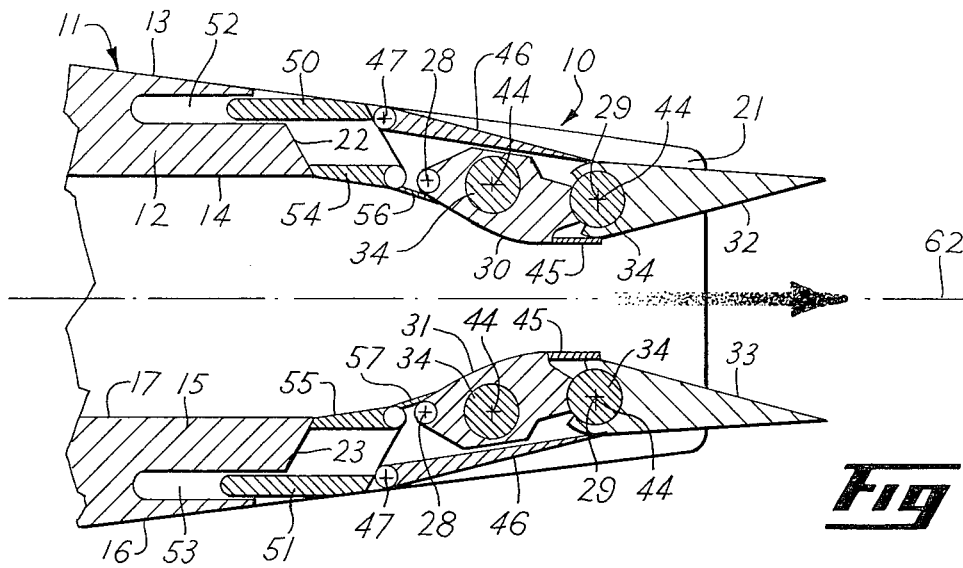
FIG. 2 is a longitudinal cross-sectional view of the exhaust nozzle including the primary and secondary flaps and showing the reverser doors in the closed position.

Referring now to FIGS. 1 and 2, the portion of the engine nacelle 11 upstream of the exhaust opening comprises an upper wall 12, which includes an outer surface 13 and an inner surface 14, and a lower wall 15, which includes an outer surface 16 and an inner surface 17. Disposed on the sides of the engine nacelle 11 are the sidewalls 20 and 21. The sidewalls 20 and 21 are spaced apart transversely and preferably extend downstream of the downstream ends 22 and 23 of the upper and lower walls 12 and 15, respectively. FIGS. 1 and 2 show the sidewalls 20 and 21 as being generally rectangular. However, the shape of the sidewalls can be modified as desired. The aforementioned portions of the nacelle 11, that is, the upper wall 12, the lower wall 15, and the sidewalls 20 and 21 are fixed structures. By a "fixed structure" is meant a structure that is static, or fixed in place, relative to a reference, such as an aircraft wing or fuselage. As will be discussed hereinafter, such fixed structures provide suitable mounts to which pivotable elements can be attached.

Disposed downstream of the downstream ends 22 and 23 of the upper and lower walls 12 and 15 are a plurality of flaps which, together with the sidewalls 20 and 21 define an exhaust opening for gases exiting the engine. The flaps are preferably pivotally positionable for enabling variation in the size of the exhaust opening and for vectoring of the engine thrust.

The flaps include a plurality of primary flaps and a plurality of secondary flaps. In the preferred embodiment shown in FIG. 2, there are two vertically spaced apart primary flaps 30 and 31 and two vertically spaced apart secondary flaps 32 and 33, all of which extend transversely between the sidewalls 20 and 21, the secondary flaps being of substantially the same width as the primary flaps. The primary flap 30 is disposed downstream of the upper wall 12 and, together with the secondary flap 32, defines the upper boundary of the exhaust opening. The primary flap 31 is disposed downstream of the lower wall 15 and, together with the secondary flap 33, defines the lower boundary of the exhaust opening.

Figure 4:
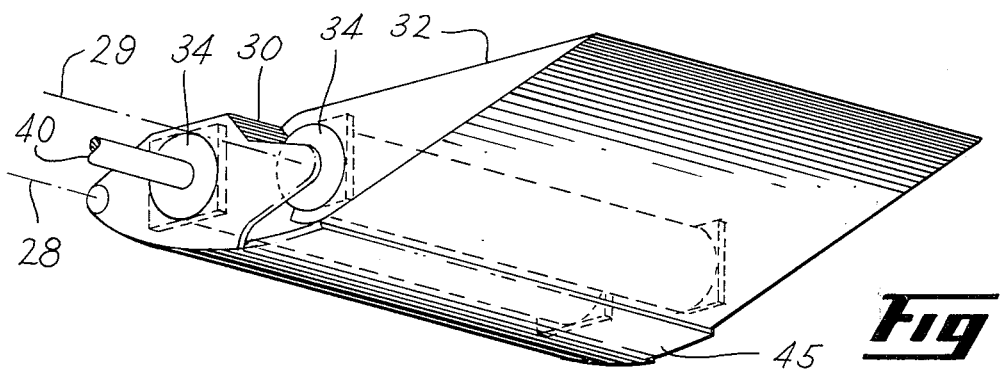
FIG. 4 is a perspective view of a primary and secondary flap.

As is seen in FIGS. 2 and 4, the upstream portion of each primary flap 30 and 31 is pivotally connected at both sides of the flap, along the pivot axis depicted by the dashed line 28 with a fixed structure of the nacelle 11, such as the sidewalls 20 and 21. The upstream portion of each of the secondary flaps 32 and 33 is pivotally connected, along the pivot axis depicted by the dashed line 29 with the downstream end of one of the primary flaps 30 or 31. Each primary and each secondary flap is preferably pivotable to selectable positions independently of any other primary or secondary flap, thus enabling the exhaust opening to be selectively varied in size and the engine thrust to be vectored in desired directions.

Figure 3:
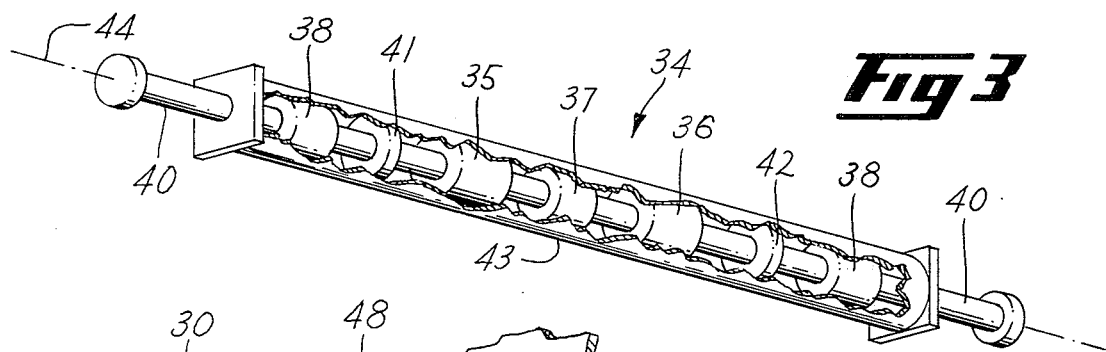
FIG. 3 is a perspective view of an electromechanical actuator showing the components therein.

The exhaust nozzle 10 includes means for pivotally positioning the primary and secondary flaps. One example of suitable means is an electromechanical actuator 34. An electromechanical actuator converts electrical energy into a mechanical output. An example of an electromechanical actuator 34 is shown in FIG. 3, and a similar actuator is also described in the Society of Automotive Engineers Report No. 771004, dated November, 1977, the disclosure of which is incorporated herein by reference. The electromechanical actuator comprises at least one and preferably a pair of electrical motors 35 and 36, which drive through a coupling 37 and through gear reduction units 38 to rotate torque shafts 40 at least one of which and preferably both are connected either to the sidewalls 20 and 21, in the case of the actuators disposed in the primary flaps, or to the downstream ends of the primary flaps 30 and 31, in the case of the actuators disposed in the secondary flaps. The redundancy of electric motors provides a backup in case of failure of one. Brakes 41 and 42 can be included to lock a motor and prevent its rotation after it has failed or to lock a control surface in position. The components of the electromechanical actuator 34 are preferably enclosed within a generally cylindrical container 43. As can be seen in FIGS. 2 and 4, the electromechanical actuator 34 so enclosed within the cylindrical container 43 is of a shape and size so as to be conveniently disposed within the upstream portions of the primary and secondary flaps 30, 31, 32, and 33.

The use of an electromechanical actuator is preferable to using a conventional hydraulic system to position the primary and secondary flaps because the electromechanical actuator weighs less and occupies less space than would hydraulic plumbing, valving, and servo units, thereby reducing cost and allowing the primary and secondary flaps to be more streamlined. Furthermore, the electromechanical actuators can be used with low cost microprocessors to provide changes in flap position as a function of pilot commands, engine cycle parameters, or aircraft flight conditions. Nevertheless, if desired, a hydraulic system or other positioning means can be used to pivotally position the primary and secondary flaps 30, 31, 32, and 33.

Figure 3A:
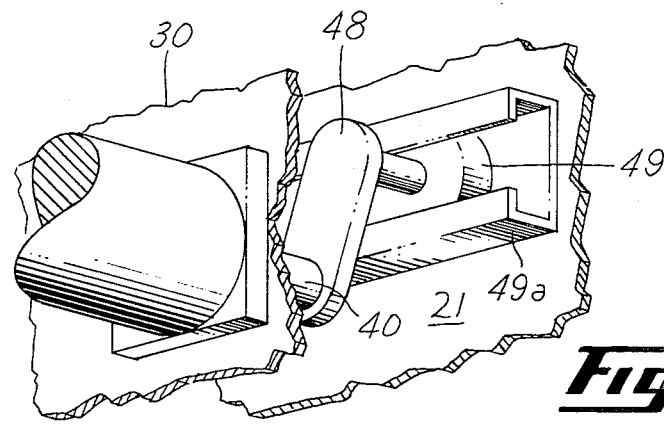
FIG. 3a is a fragmentary view of an end of the electromechanical actuator of FIG. 3 showng an alternative arrangement of securing the torque shaft to a sidewall.

As shown in FIGS. 2 and 4, an electromechanical actuator 34 is disposed within the upstream portion of each primary flap 30 and 31 and at least a part of the electromechanical actuator, and preferably each end, is fixedly secured with the primary flap within which it is disposed. As shown in FIGS. 3 and 4, the torque shafts 40 of each electromechanical actuator 34 which is disposed within a primary flap extend transversely along a transverse axis, depicted by the dashed line 44, from the actuator, through the sides of the primary flaps, and are secured with the sidewalls 20 and 21. In the configuration shown in FIGS. 2 and 4, the pivot axis 28 of the primary flaps is not located along the transverse axis 44 of the electromechanical actuator. In that situation, an arrangement similar to that shown in FIG. 3a can be used to facilitate pivotal movement of the primary flaps. As shown in FIG. 3a, the torque shaft 40 is rigidly connected with a crank 48 extending perpendicularly from the torque shaft 40. The crank 48 is pivotally connected to a shuttle 49 which slides axially within a track 49a fixedly secured with a sidewall 20 or 21. Thus, when the torque shaft 40 is rotated by the electromechanical actuator 34, the crank 48 is also rotated. The crank 48 exerts a force against the track 49a, which in turn causes a reactionary upward or downward pivotal movement of the primary flap. The fact that the connecting point (the shuttle 49) between the crank 48 and the track 49a is axially moveable permits the pivotal movement of the primary flaps to be about the pivot axis 28.

As is shown in FIGS. 2 and 4, an electromechanical actuator 34 is disposed within the upstream portion of each secondary flap 32 and 33 and at least a part of the electromechanical actuator, preferably each end, is fixedly secured with the secondary flap within which it is disposed. The torque shafts 40 extend from the electromechanical actuator 34, through the sides of the secondary flaps and are secured with the downstream end of the adjacent primary flap. This relationship between the primary and secondary flaps can be achieved, for example, by the arrangement shown in FIG. 4 wherein the downstream end of the primary flap 30 includes a recess between the sides of the flap sized for receiving the upstream portion of the secondary flap 32. When the torque shafts 40 are rotated by the electromechanical actuator 34, since the torque shafts are secured with the primary flap, the secondary flap 32 or 33 will be pivoted with the electromechanical actuator 34, which is secured with it, about the pivot axis 29 which is coaxial with the transverse axis 44 of the electromechanical actuator.

The above-described arrangement permits each primary and each secondary flap to be pivotally positionable independent of any other primary or secondary flaps.

In order to provide a streamlined, continuous flowpath for exhaust gases across the inner surfaces of the primary flaps 30 and 31 and the secondary flaps 32 and 33, an inner flap 45, shown in FIGS. 2 and 4, is pivotally connected with the downstream portion of the inner surface of each primary flap 30 and 31. Each inner flap 45 extends transversely across the width of each primary flap and is biased such that the downstream end of it slidingly engages, or rides against, the inner surface of the forward portion of the adjacent secondary flap 32 or 33. The secondary flap can thus be pivoted relative to the primary flap and the inner flap 45 will maintain a continuous sealed inner surface between the two.

In order to provide a continuous path for the airflow across the outer surfaces of the primary and secondary flaps 30, 31, 32, and 33, fairing flaps 46 can be utilized. As is best seen in FIG. 2, each fairing flap 46 is disposed outward of each primary flap 30 or 31, extends transversely between the sidewalls 20 and 21, respectively, and extends downstream such that the downstream end is adjacent the upstream portion of the secondary flap 32 or 33. The fairing flap 46 is pivotally connected to the sidewalls by means, such as a rod 47. In an alternative arrangement (not shown), the fairing flap 46 is hinged to the downstream end of the upper or lower wall 12 or 15. Each fairing flap 46 is preferably biased by the force of air passing across it or by other means such as a spring, to engage the outer surface of either a primary flap 30 or 31, or a secondary flap 32 or 33, or both, depending upon their pivotal positions.

As can be seen in FIGS. 2 and 4, each primary flap 30 and 31 preferably includes an inner surface which is curved convexly in the downstream direction. In this arrangement, the throat, or minimum distance between opposing flowpath surfaces, of the exhaust nozzle 10 is always located at a position along the inner surfaces of the primary flaps, regardless of the pivotal position of any of the primary or secondary flaps. Thus, the exhaust nozzle 10 defines a convergent/divergent exhaust opening, which is desirable particularly for supersonic flights, at all pivotal positions of the primary and secondary flaps. This arrangement results in the high jet pressure loads which are exerted on the throat being exerted on the primary flaps which are directly connected with a fixed structure of the nacelle, such as sidewalls 20 and 21. The primary flaps 30 and 31 are better able to withstand the forces and moments associated with the throat than are the secondary flaps 32 and 33 which are connected with the primary flaps in a cantilever arrangement. Another advantage to having the throat always located on the primary flaps is that the throat is therefore in a relatively upstream position and a long divergent section of the nozzle from the throat to the end of the secondary flaps is thereby provided.

Each secondary flap 32 and 33 preferably has a generally wedge-shaped cross section that is tapered in the downstream direction. This shape of the secondary flap is effective for providing a divergent flowpath to the exhaust gases while allowing the external surfaces of the nozzle to remain streamlined.

Figure 5:
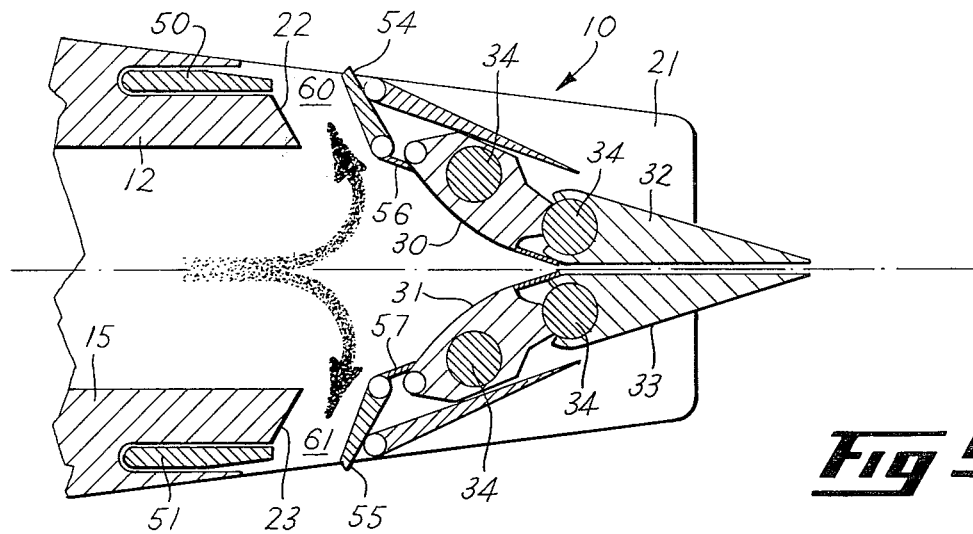
FIG. 5 is a view of the exhaust nozzle in the thrust reverser configuration with the primary and secondary flaps pivoted inwardly and the reverser doors open.

As can be seen in FIGS. 2 and 5, the exhaust nozzle 10 can include a thrust reversal arrangement. In the embodiment shown, outer reverser doors 50 and 51 extend transversely between the sidewalls 20 and 21 and are slidingly connected with the upper and lower walls 12 and 15, respectively. The upstream ends of the outer reverser doors 50 and 51 are disposed within cavities 52 and 53 in the upper and lower walls 12 and 15 respectively, and, when in the closed position, protrude downstream from the downstream ends 22 and 23 of the upper and lower walls such that the external surfaces of the outer reverser doors are substantially adjacent the outer surfaces 13 and 16 of the upper and lower walls. As is shown in FIG. 5, the outer reverser doors 50 and 51 can be translated by means (not shown) forward, or upstream, into an open position such that they are completely enclosed within the cavities 52 and 53.

Inner reverser doors 54 and 55 are pivotally connected with and extend transversely between the sidewalls 20 and 21. In the embodiment shown, the inner reverser doors 54 and 55 are disposed downstream of the upper and lower walls 12 and 15 respectively, and, when in the closed position shown in FIG. 2, the inner surfaces of the doors are adjacent the inner surfaces 14 and 17 of the upper and lower walls 12 and 15, respectively. As seen in FIG. 5, the inner reverser doors 54 and 55 are pivotable by means (not shown) into an open position, and when so pivoted are spaced apart and generally parallel to the downstream end 22 and 23 of the upper and lower walls 12 and 15. Pivotable flange members 56 and 57 can be disposed between the inner reverser doors 54 and 55 and the upstream ends of the primary flaps 30 and 31 in order to maintain a continuous surface between the inner reverser doors and the primary flaps.

When the outer reverser doors 50 and 51 and the inner reverser doors 54 and 55 are in their open positions, as is shown in FIG. 5, reverser passages 60 and 61 are defined, and thereby communication is provided for exhaust gases from the interior to the exterior of the exhaust nozzle 10. The reverser passages 60 and 61 are bounded by the downstream ends 22 and 23 of the upper and lower walls 12 and 15, by the inner reverser doors 54 and 55, and by the sidewalls 20 and 21, respectively.

The exhaust nozzle 10 operates as follows. Referring first to FIG. 2, the exhaust nozzle 10 is configured as a conventional exhaust nozzle. The primary and secondary flaps 30, 31, 32, and 33 are aligned equidistantly from the engine longitudinal axis, depicted by the dashed line 62, and the outer and inner reverser doors 50, 51, 54, and 55 are closed. In this configuration, the exhaust gases exit the nozzle in the direction of the arrow, parallel to the engine longitudinal axis 62. Engine thrust, which is directed opposite to the direction of the flow of exhaust gases, is therefore in the forward direction parallel to the engine longitudinal axis 62.

Figure 6:
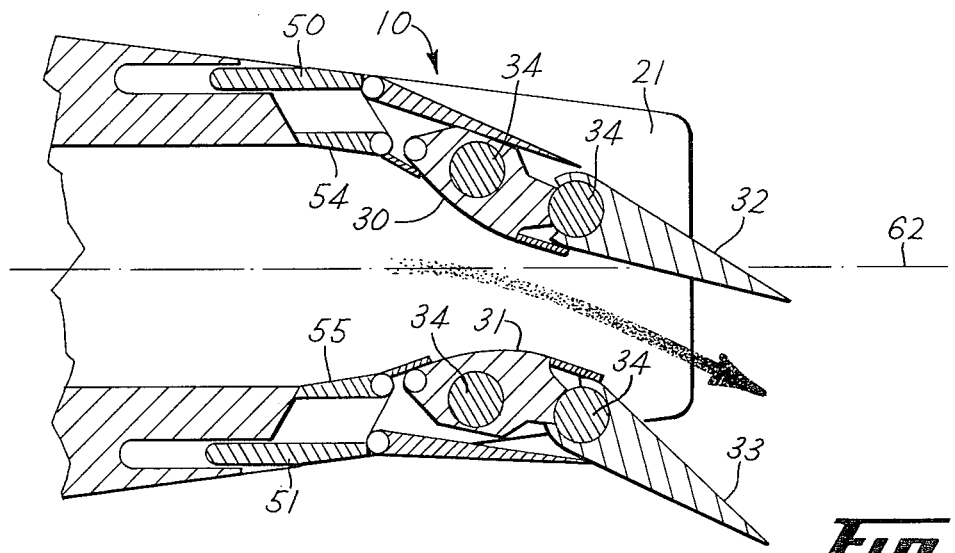
FIG. 6 is a view of the exhaust nozzle in a thrust vectoring configuration.

Referring next to FIG. 6, the outer and inner reverser doors 50, 51, 54, and 55 remain closed. However, each primary and each secondary flap 30, 31, 32, and 33 have been pivotally positioned downwardly by electromechanical actuators 34. As a result, the exhaust gases exiting the exhaust nozzle 10 are diverted in a downward direction as shown by the arrow, and the engine thrust is vectored in an upward direction. Thus, engine thrust vectoring has been accomplished by pivotally positioning the primary and secondary flaps. As described earlier, even in such a downwardly directed configuration, the exhaust nozzle still defines a converging/diverging exhaust opening with the nozzle throat located at a position on the primary flaps. It is to be understood, of course, that the primary and secondary flaps can be pivoted to many other combinations of positions and thus are effective not only to vector the engine thrust but also to vary the size of the exhaust opening.

Referring now to FIG. 5, the exhaust nozzle is shown in the thrust reversal configuration. The outer reverser doors 50 and 51 are in the open position, having been translated into the cavities 52 and 53. The inner reverser doors 54 and 55 have been pivoted to the open position. Reverser passages 60 and 61 are defined between the inner reverser doors and the downstream ends 22 and 23 of the upper and lower walls 12 and 15. The primary flaps 30 and 31 are pivotally positioned inwardly toward each other by the electromechanical actuators 34, and the secondary flaps 32 and 33 are pivotally positioned by the electromechanical actuators 34 such that their inner surfaces are adjacent and abutting or nearly abutting each other. In this configuration, the exhaust opening is blocked and the exhaust gases are diverted by the primary flaps which act as blockers, through the reverser passages 60 and 61, as shown by the arrows. As a result, thrust reversal occurs.

It is to be understood that this invention is not limited to the particular embodiments disclosed and it is intended to cover all modifications coming within the true spirit and scope of this invention as claimed.

What is claimed is:

1. An exhaust nozzle for a gas turbine engine comprising:
   (a) a fixed structure;
   (b) a plurality of primary flaps each having a portion pivotally connected with said fixed structure and having an inner surface curved convexly in a downstream direction;
   (c) a plurality of secondary flaps disposed downstream of said primary flaps, each of said secondary flaps having a portion pivotally connected with a downstream end of one of said primary flaps in a cantilever arrangement therewith; and
   (d) means for pivotally positioning said primary and said secondary flaps;
   each of said primary flaps and each of said secondary flaps being pivotably positionable independently of any other primary or secondary flap.

2. An exhaust nozzle of a gas turbine engine comprising:
   (a) two transversely spaced apart sidewalls;
   (b) two primary flaps spaced vertically apart and extending between said sidewalls, each primary flap having an upstream portion pivotally connected with said sidewalls, having an inner surface curved convexly in the downstream direction, and having an inner flap connected with the downstream portion of said inner surface;
   (c) two secondary flaps disposed downstream of said primary flaps and extending substantially the width thereof, each of said secondary flaps having an upstream portion pivotally connected with a downstream end of one of said primary flaps in a cantilever arrangement therewith, the forward portion of the inner surface of each of said secondary flaps being slidingly engaged by said inner flap of an adjacent primary flap for providing a continuous surface between said primary and said secondary flaps; and
   (d) means for pivotally positioning said primary and said secondary flaps;
   each of said primary flaps and each of said secondary flaps being pivotably positionable independently of any other primary or secondary flap.

3. The exhaust nozzle of claim 2 further comprising two fairing flaps, one fairing flap being disposed outwardly of each of said primary flaps and pivotally connected with said sidewalls upstream of said primary flaps, each said fairing flap being biased to engage an outer surface of one of said primary flaps, or one of said secondary flaps, or a primary and a secondary flap, depending upon the pivotal positions thereof.

4. The exhaust nozzle of claim 2 wherein said means for pivotally positioning said primary flaps and said secondary flaps comprise electromechanical actuators.

5. The exhaust nozzle of claim 4 wherein one of said electromechanical actuators is disposed within and secured with said upstream portions of each of said primary flaps and each of said secondary flaps.

6. The exhaust nozzle of claim 2 further comprising vertically spaced apart upper and lower walls disposed upstream of and spaced apart from said primary flaps, and outer and inner reverser doors for, together with the downstream ends of said upper and lower walls, defining reverser passages for providing communication of exhaust gases from the interior to the exterior of said exhaust nozzle.

7. An exhaust nozzle for a gas turbine engine comprising:
   (a) two transversely spaced apart sidewalls extending downstream of said engine;
   (b) vertically spaced apart upper and lower walls;
   (c) outer and inner reverser doors which, together with the downstream ends of said upper and lower walls, define reverser passages for providing communication of exhaust gases from the interior to the exterior of said exhaust nozzle;
   (d) two primary flaps spaced vertically apart, extending between said sidewalls, and disposed downstream and apart from said upper and lower walls, each said primary flap including an electromechanical actuator disposed in the upstream portion thereof, said electromechanical actuator being secured with said primary flap and having at least one torque shaft secured with one of said sidewalls and being thereby effective for pivotally positioning said primary flaps; and
   (e) two secondary flaps spaced vertically apart, extending substantially between said sidewalls, and disposed downstream and adjacent said primary flaps, each of said secondary flaps including an electromechanical actuator disposed in the upstream portion thereof, each said electromechanical actuator being secured with said secondary flap and having at least one torque shaft secured with a downstream portion of one of said primary flaps and being thereby effective for pivotally positioning said secondary flap.

8. The exhaust nozzle of claim 7 wherein said upper and lower walls include cavities therein, said outer reverser doors are disposed within said cavities and are translatable into and out of said cavities, and said inner reverser doors are pivotably disposed between said primary flaps and the downstream ends of said upper and lower walls.

9. The exhaust nozzle of claim 7 further comprising two fairing flaps, one fairing flap being disposed outwardly of each of said primary flaps, being pivotally connected with said sidewalls, and extending downstream such that the downstream end thereof is adjacent one of said secondary flaps.

10. The exhaust nozzle of claim 7 wherein each of said primary flaps has an inner surface curved convexly in the downstream direction.

11. In a gas turbine engine having a fixed structure and including a nacelle having a downstream end for discharging exhaust gases generally along an longitudinal axis thereof to produce thrust, a variable exhaust nozzle attached to said fixed structure and communicating with said downstream end of said nacelle, said nozzle having a plurality of flap assemblies spaced from said longitudinal axis and defining an exhaust opening therebetween, each flap assembly comprising:
   (a) a primary flap having an upstream end and a downstream end, said upstream end being pivotably connected with said fixed structure;
   (b) a secondary flap disposed downstream of said primary flap and having an upstream end and a downstream end, said upstream end being pivotably connected with said downstream end of said primary flap in a cantilever arrangement therewith;
   said primary flap and said secondary flap being independently pivotable for enabling said exhaust opening to be selectively varied in size and said engine thrust to be vectored in a predetermined direction.

12. The exhaust nozzle according to claim 11 wherein said flap assembly further comprises means for pivotably positioning said primary flap and said second secondary flap.

13. The exhaust nozzle according to claim 11 further comprising:
   (a) first means for controlling pivotal position of said primary flap with respect to said fixed structure; and
   (b) second means for controlling pivotal position of said secondary flap with respect to said downstream end of said primary flap.

14. The exhaust nozzle according to claim 13 wherein each of said first and second means is an electromechanical actuator.

15. The exhaust nozzle according to claim 11 wherein said primary and secondary flaps are pivotable to a position for vectoring engine thrust obliquely to said longitudinal axis.

16. The exhaust nozzle according to claim 11 further comprising thrust reverser passages for providing communication of said exhaust gases from an interior to an exterior of said exhaust nozzle and wherein said primary and secondary flaps are pivotable to a position for defining a substantially closed exhaust opening to block exhaust flow therethrough and to divert the exhaust gases through said reverser passages.

* * * * *